United States Patent

[11] 3,560,817

| [72] | Inventor | Carmelo J. Amato |
| | | Livonia, Mich. |
| [21] | Appl. No. | 795,410 |
| [22] | Filed | Jan. 31, 1969 |
| [45] | Patented | Feb. 2, 1971 |
| [73] | Assignee | Ford Motor Company |
| | | Dearborn, Mich. |
| | | a corporation of Delaware |

[54] RELUCTANCE MOTOR POWER CIRCUIT
12 Claims, 5 Drawing Figs.

[52] U.S. Cl. .................................................. 318/138,
318/139, 321/45, 310/163
[51] Int. Cl. ................................................... H02k 29/02
[50] Field of Search ...................................... 318/138,
254, 439, 139; 310/49, 163; 321/45C (Inquired)

[56] References Cited
UNITED STATES PATENTS

| 3,207,974 | 9/1965 | McMurray | 321/45(C) |
| 3,299,336 | 1/1967 | Johannes | 318/138 |
| 3,308,371 | 3/1967 | Studtmann | 321/45(C) |
| 3,321,685 | 5/1967 | Johannes | 318/138 |
| 3,437,854 | 4/1969 | Oiso | 318/138 |
| 3,444,447 | 5/1969 | Newell | 318/138 |
| 3,466,519 | 9/1969 | Platnick | 318/138 |

Primary Examiner—G.R. Simmons
Attorneys—John R. Faulkner and Glenn S. Arendsen

ABSTRACT: Conventional SCRs and diodes are used to apply DC electric power from a storage battery to a winding of a reluctance-type motor. The circuit provides full and partial motoring and regenerative braking, freewheels the winding current at low speeds to improve motor torque, and returns winding current to the storage battery at the end of the motoring cycle to improve efficiency. Electrically powered automotive vehicles use the circuit to great advantage and the circuit also can be used in stationary industrial applications.

PATENTED FEB 2 1971

INVENTOR
CARMELO J. AMATO

BY John R. Faulkner
Glenn S. Arendsen
ATTORNEYS

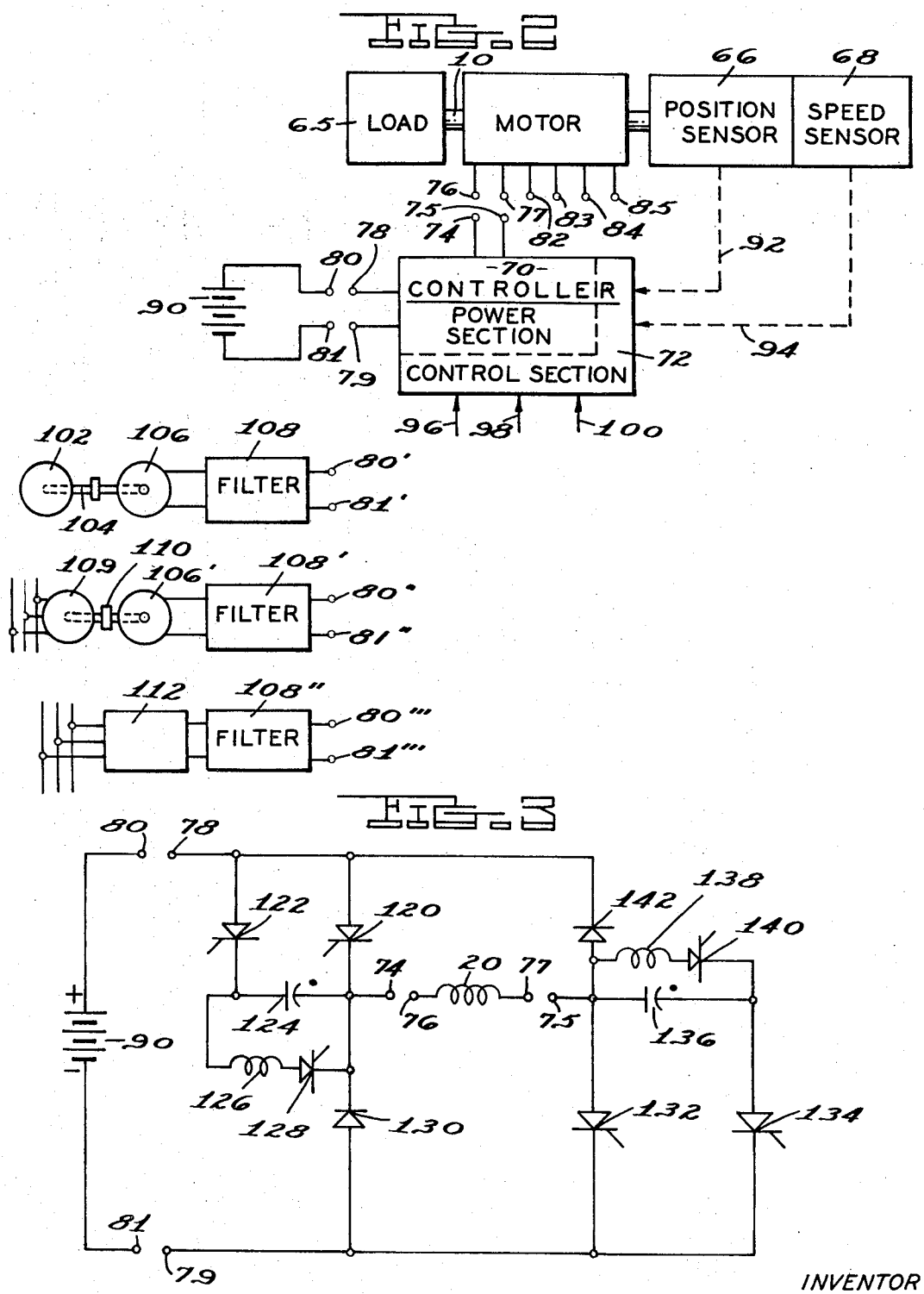

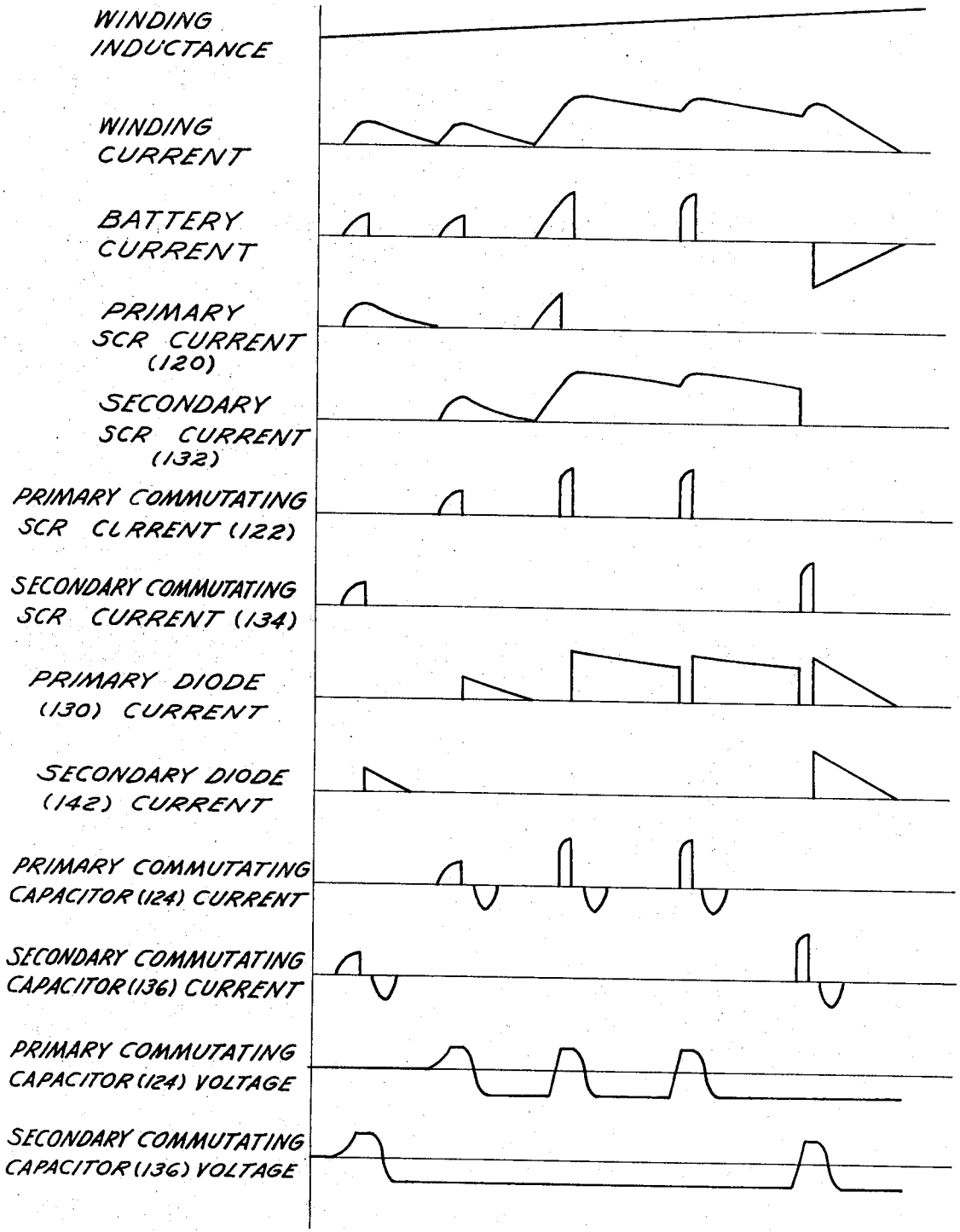

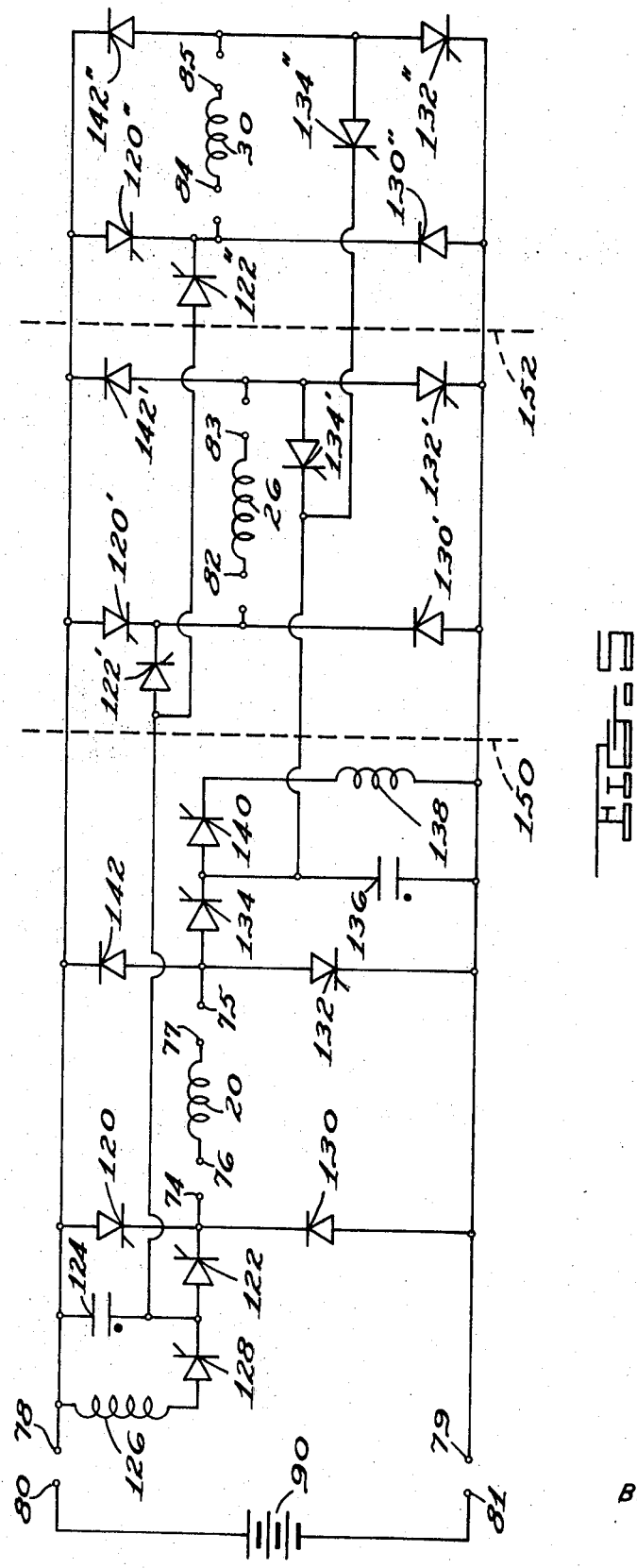

RELUCTANCE MOTOR POWER CIRCUIT

SUMMARY OF THE INVENTION

Brushless electric motors are being used in a variety of applications where a high torque is required at low speeds and where the motors must be capable of operating at relatively high speeds exceeding 6,000 r.p.m. In many applications, such motors must operate efficiently from a DC source of electrical energy such as a storage battery. Previous circuits used to couple the motor windings to DC power sources contained large numbers of semiconductors to approach the preferred waveforms and wasted considerable amounts of electrical energy at the end of the motoring cycle.

The power circuit provided by this invention uses controlled rectifiers and diodes to couple a DC source of electrical energy to a variable reluctance type motor in a manner producing a high degree of electrical efficiency. Winding current is shaped to approach a desired waveform via a process provided by the invention. For descriptive purposes it is desirable to designate each motor winding as having a primary terminal and a secondary terminal although in practice there is nothing to distinguish the primary terminal from the secondary terminal since current in either direction produces torque. A primary switching device connects the positive battery terminal to the winding primary terminal and a secondary switching device connects the secondary terminal of the motor winding to the negative battery terminal. Primary and secondary commutating circuits are connected in parallel with the respective primary and secondary switching devices. Each of the commutating circuits includes a commutating capacitor in series with a power-type switching device, herein designated the commutating switching device. A primary rectifier connects the negative battery terminal to the primary terminal of the motor winding and a secondary rectifier connects the secondary terminal of the motor winding to the positive battery terminal.

All switching devices are connected to conduct conventional current from the battery positive terminal through the motor winding to the battery negative terminal when in the conducting states. The rectifiers are reverse biased by battery polarity but become forward biased under the polarity developed by the collapsing field of the motor winding at the end of a motoring or braking mode to return current to the battery. In addition, each rectifier combines with the appropriate primary or secondary switching device to produce a circuit that freewheels the winding current at lower motor speeds to shape the current waveform to approach the waveform producing maximum torque.

A disc-type variable reluctance motor is preferably used with the power circuit of this invention. Smooth torque generation is provided by using multiple phases, preferably three or more. Each phase comprises a toroidal winding that surrounds stationary stator disc having pie-shaped sections of laminated steel spaced by minimum permeance sections usually made of aluminum or reinforced polymeric materials. A rotor disc of similar construction is mounted on each side of the stator disc. The periphery of each rotor is wound with a thin layer of a high strength, low permeance material such as fiberglass to increase the maximum potential rotor speed.

The power circuit of this invention is useful particularly in an electrically powered vehicle where the motor is connected to a vehicle wheel. High torque is generated at low speeds by the idealized wave shape produced by the power circuit, and the current returned to the vehicle battery improves significantly the overall efficiency. Moreover, vehicle braking similar to the braking generated by an internal combustion engine can be provided and the energy generated during vehicle braking applied to the battery without additional power circuit components.

Speed sensors and position sensors are connected to the motor shaft and coupled to the control section of a controller that contains the power circuit. A torque level input, forward or reverse input, and a system protection input also are coupled to the control section which combines the inputs to produce the desired switching sequence of the switching devices in the power circuit. System protection inputs include devices for shutting off all circuits to a motor in case the load on the motor disappears suddenly, such as when a vehicle wheel begins spinning on ice. The torque level input and the forward or reverse inputs are of course controlled by the driver or operator.

In nonvehicle applications, other sources of the DC electrical energy can be used in place of a storage battery. For example the power input to the power circuit can be provided by a DC generator driven mechanically from any prime mover such as a reciprocating engine or a gas turbine engine to produce an electrical transmission system, three-phase industrial power can be used to operate an induction machine mechanically coupled to a DC generator, or the three-phase industrial power can be coupled through electronic rectifier and converter.

BRIEF DESCRIPTION OF THE DRAWINGS

FIG. 2 is a schematic of the overall system showing the relationship of the controller and the energy sources to the motor. Alternative DC energy sources also are shown in the FIG. . FIG. 3 is a schematic of a power circuit of this invention for one phase of the motor. Similar power circuits are provided for the other phases. FIG. 4 shows the waveforms of the current and voltage in the major components of the FIG. 3 power circuit during a complete motoring cycle. FIG. 5 is a schematic of an alternate power circuit that uses only two commutating circuits to commutate the SCRs in the power circuits for several motor windings.

DETAILED DESCRIPTION

Figure 1:
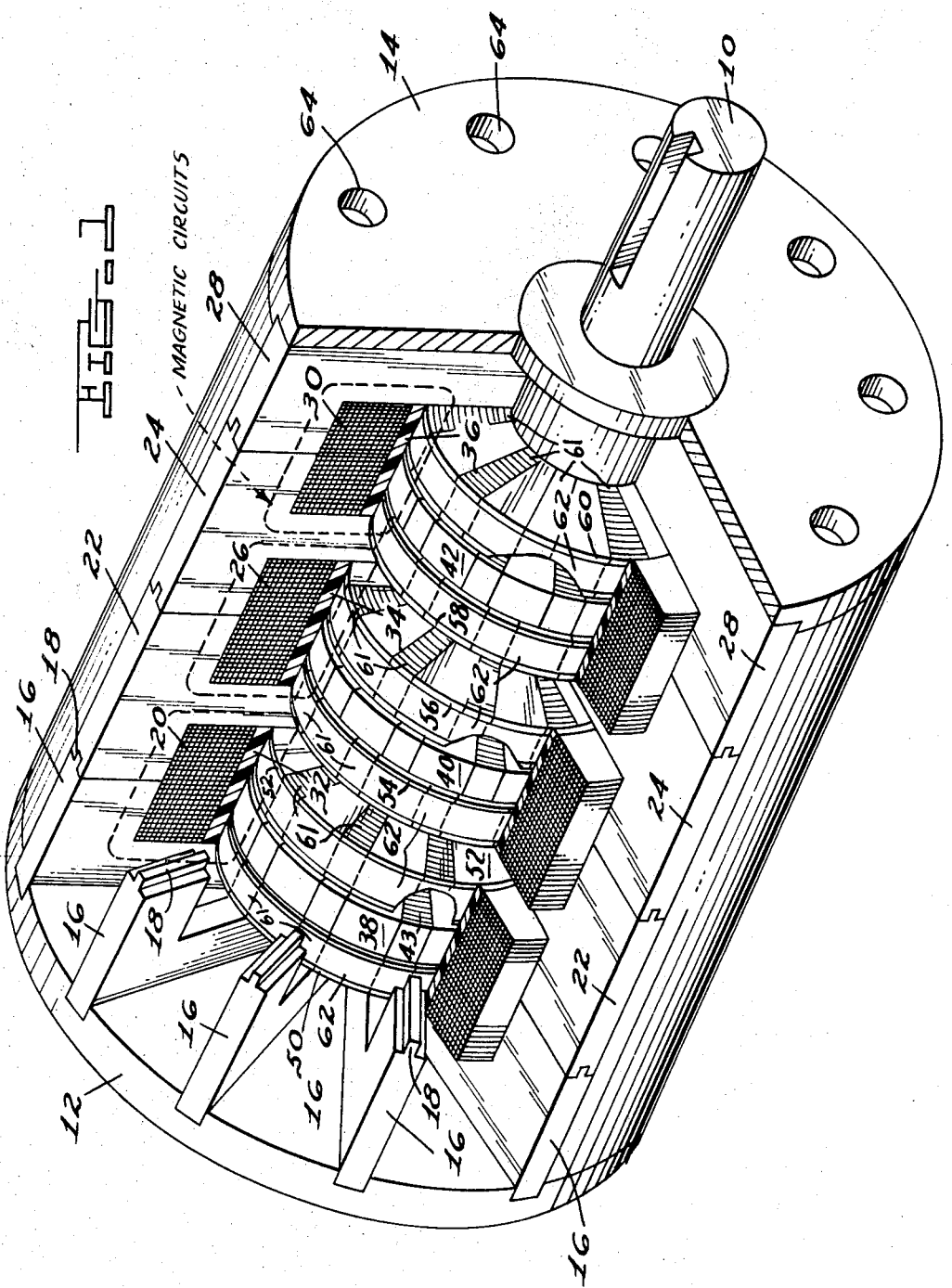
FIG. 1 is a sectioned perspective showing the construction of a three-phase disc-type reluctance motor capable of using the power circuit of this invention to great advantage.

Referring to the motor construction of FIG. 1, a motor shaft 10 is mounted rotatably in two end plates 12 and 14. A plurality of L shaped members 16 have their longer legs positioned in shallow grooves on the inner face of end plate 12. The shorter legs of members 16 project axially inward with the outer surfaces thereof at the approximate level of the outer periphery of end plate 12. Members 16 are made of laminated steel with the laminations running parallel to the shaft axis and have small radially directed tongues 18 at the inner surfaces of the shorter legs.

A toroidal winding 20 has one-half of its width fitting into the steps of L-shaped members 16 and is held in place by a plurality of T-shaped members 22. Members 22 have a groove cooperating with tongue 18. Similar T-shaped members 24 hold the winding 26 of the second phase in place against members 22 and L-shaped members 28 cooperate with T-shaped members 24 to hold the winding 30 of the third phase in place. Members 22, 24 and 28 also are made of laminated steel.

Rims 32, 34 and 36 of fiberglass are positioned against the radially interior surfaces of respective windings 20, 26 and 30 and are connected to the outer peripheries of respective stator discs 38, 40 and 42. Each stator disc comprises a plurality of pie-shaped laminated steel sections 43 separated by a material having a low magnetic permeance such as aluminum or a reinforced phenolic resin. The number of sections 43 in each disc corresponds to the number of L-shaped members 16 and the sections in each stator disc are aligned with members 16.

Rotor discs 50 and 52 are fastened to shaft 10 and positioned on each side of stator disc 38 to complete the first phase of the motor. Similarly, rotor discs 54 and 56 are positioned on each side of stator disc 40 and rotor discs 58 and 60 are positioned on each side of stator disc 42 to complete the second and third phases. Each rotor disc also has a pie-shaped section 61 of laminated steel surrounded by a section of a low permeance material. In a three-phase motor the laminated sections of both the stator discs and the rotor discs have a peripheral width approximately corresponding to the width of members 16 and are surrounded on each side by twice this width of the lower permeance material.

A narrow groove is cut into the periphery of each rotor disc and this groove is filled with a high strength layer of fiberglass 62. Laminated sections 61 of the rotor discs in each phase re aligned with each other. Additionally, laminated sections of the rotor discs in the second phase are spaced peripherally by the width of a section from the laminated sections of the discs in the first phase and the laminated sections of the rotor discs in the third phase are spaced in the same direction by the width of a laminated section from the corresponding sections of the discs in the second phase. Thus, when sections 61 of rotor discs 50 and 52 are aligned with sections 43 of stator disc 38, sections 61 of rotor discs 54 and 56 are aligned with imaginary sections of stator disc 40 adjacent its laminated sections, and sections 61 of disc 58 and 60 are aligned with imaginary sections of stator disc 42 adjacent its laminated sections but located on the sides opposite the imaginary sections of disc 40. Long bolts pass through appropriate holes 64 in end plates 12 and 14 to clamp the parts of the motor together.

As shown in FIG. 2, the motor of FIG. 1 has its shaft 10 connected to a load 65 on one side and a position sensor 66 and speed sensor 68 on the other side. In an electrically powered automobile, a vehicle driving wheel constitutes load 65. A controller made up of a power section 70 and a control section 72 has its output terminals 74 and 75 connected to the primary and secondary terminals 76 and 77 respectively of the first phase winding 20. Input terminals 78 and 79 of power section 70 are connected to the respected positive and negative terminals 80 and 81 of a DC battery 90. Two similar controllers (not shown) have their output terminals connected to the terminals 82 and 83 of the second phase winding 26 and the terminals 84 and 85 of the third phase winding 30.

Signals generated by the position sensor and the speed sensor are fed into control section 72 as indicated by dashed lines 92 and 94. Signals representative of the desired torque input, a forward or reverse function, and a system protection input also are applied to control section 72 as represented by arrows 96, 98 and 100.

FIG. 2 also presents schematically other sources of DC power suitable for connection to input terminals 78 and 79 of each controller. In the first alternate source, a gas turbine or internal combustion engine 102 is coupled mechanically by a shaft 104 to a DC generator 106. The output leads of generator 106 are coupled through a filter 108 to terminals 80 ' and 81'. This arrangement uses the motor and power circuit of this invention in an electrical transmission system suitable for large commercial or military vehicles.

For industrial applications having a readily available source of three-phase AC electrical energy, a three-phase motor 109 is connected electrically to the three-phase power line and is coupled mechanically by a shaft 110 to a DC generator 106'. The output leads of generator 106' are coupled through a filter 108' to terminals 80" and 81". Alternatively, an electronic rectifier and inverter 112 connects the three phase AC system through a filter 108" to terminals 80"'and 81"'.

Referring to the control circuit shown in FIG. 3, a primary silicon-controlled rectifier 120 has its anode connected to terminal 78 and its cathode connected to terminal 74. A primary commutating silicon-controlled rectifier 122 has its anode connected to terminal 78 and its cathode connected to the undotted plate of commutating capacitor 124 (the plates are designated by dots for illustrative purposes only). The dotted plate of capacitor 124 is connected to terminal 74.

One side of an inductor 126 is connected to the undotted plate of capacitor 124 and the other side is connected to the anode of a silicon-controlled rectifier 128. The cathode of rectifier 128 and the cathode of a diode 130 that has its anode connected to terminal 79 are both connected to terminal 74.

A secondary silicon-controlled rectifier 132 has its anode connected to terminal 75 and its cathode connected to terminal 79. A secondary commutating silicon-controlled rectifier 134 has its anode connected to the dotted plate of a secondary capacitor 136 and its cathode connected to terminal 79. The undotted plate of capacitor 136 is connected to terminal 75.

One side of an inductor 138 is connected to the undotted plate of capacitor 136 and the other side is connected to the anode of a silicon-controlled rectifier 140. The cathode of rectifier 140 is connected to the dotted plate of capacitor 136. A diode 142 has its anode connected to terminal 75 and its cathode connected to terminal 78.

The FIG. 3 circuit can be operated in several different ways, each of which produces a different motor characteristic. Maximum power operation is described below with reference to the waveforms shown in FIG. 4. Circuit operation will be described with the assumption that the circuit controls the winding 20 in the first phase of the FIG. 1 motor. Similar circuits provided for the other phases operate in the same manner.

As the laminated sections 61 of rotor discs 50 and 52 rotate toward alignment with laminated sections 43 of stator disc 38, the self-inductance of winding 20 begins increasing because of the increasing magnetic coupling. The secondary commutating capacitor 136 is charged by applying a triggering pulse to the gate terminal of SCRs 120 and 134. The relatively small amount of charging current passes through motor winding 20 and thereby provides some motoring torque. When the charge on the undotted plate of capacitor 136 approximately equals battery voltage both SCRs self-commutate. The charge on capacitor 136 is reversed promptly by triggering SCR 140. Inductor 138 then pumps the charge to the dotted plate of capacitor 136 so a positive battery voltage exists on the dotted plate.

By a similar process, a charge approximately equivalent to battery voltage is formed on capacitor 124 and switched to the dotted plate thereof. In this case triggering pulses initially are applied to the gate terminals of SCRs 122 and 132. Again the current flows through winding 20 and a small amount of motoring torque is developed. The battery voltage produced on the undotted plate of capacitor 124 is switched to the dotted plate by triggering SCR 128.

Main motoring torque now is achieved by triggering primary SCR 120 and secondary SCR 132 to apply battery voltage directly across winding 20. When the current through winding 20 reaches some predetermined value, a pulse is applied to the gate terminal of SCR 122. The predetermined current value is sensed by any sensing means associated with the circuit and is selected according to the motoring torque desired. Triggering SCR 122 applies the battery voltage stored on capacitor 124 across SCR 120 and thereby commutates SCR 120. Capacitor 124 discharges through winding 20 and then a positive charge begins building on the undotted plate of capacitor 124, both of which increase slightly the current in winding 20.

When capacitor 124 has again charged to battery voltage, SCR 122 self commutates. SCR 132 remains in its conducting state, and acting under the influence of the self-inductance of winding 20, the current in the winding freewheels through the circuit formed by SCR 132 and diode 130. The resistance and increasing inductance of winding 20 produce current decay during the freewheeling period. SCR 128 is triggered during freewheeling to pump the positive charge on the undotted plate of capacitor 124 to its dotted plate. When the freewheeling current through winding 20 decreases to some predetermined value, SCR 122 again is triggered, thereby again discharging capacitor 124 through winding 20 and then recharging the capacitor from the battery. When the capacitor has recharged to battery voltage on its undotted plate, SCR 122 self commutates. Another freewheeling mode takes place and during the freewheeling the charge on capacitor 124 again is reversed by triggering SCR 128. This method of operation continues for the desired number of freewheeling modes.

When the laminated sections 61 of the rotors have moved into perfect alignment with the laminated section 43 of the stator, the current in winding 20 must be removed as rapidly as possible since any current present in the next increment of rotation provides a braking torque. Thus as the laminated sections approach alignment, control section 72 supplies a triggering pulse to the gate of SCR 134. SCR 134 immediately applies the positive voltage on the dotted plate of capacitor 136 across SCR 132, thereby commutating SCR 132. Capacitor 136 discharges through SCR 134, diode 130, and winding 20 to increase the winding current momentarily. Resonance of winding 20 and capacitor 136 forms a positive charge on the undotted plate of the capacitor, and SCR 134 self-commutates. The inductance of winding 20 then forward biases diodes 130 and 142 and the current in the winding rapidly flows back to battery 90, thus completing the motoring cycle of the first phase. During this operation, the charge across capacitor 136 is reversed for the next cycle.

The motoring cycle for the second phase of the motor then begins and is carried out by a circuit similar to FIG. 3. Upon completion of the second phase motoring cycle, the third phase motoring cycle begins. Thus full torque motoring of all phases occurs sequentially to provide a smooth torque output. At the end of each motoring cycle, the winding current is returned to the battery to improve efficiency.

Partial torque operation is achieved by appropriate limitations in the maximum winding current. Such limitations are determined by commutation of SCR 120 at the appropriate point in time. Less efficient partial torque operations can be provided by using only one freewheeling mode but a less desirable current waveform is achieved. The circuit of this invention also can be used in a regenerative braking mode of operation by triggering the SCRs while the winding inductance is decreasing, which occurs while the laminated sections 61 are moving out of alignment with laminated section 43. Time sharing operation of the SCRs also can be achieved by operating the circuit in the manner described above for one cycle and then reversing the triggering of the primary and secondary components for the next cycle.

Transistors or other solid-state devices can be substituted for the silicon-controlled rectifiers if desired. The commutating circuits for such transistors then include the connections to the base terminals of the transistors.

Motor 10 can contain more or less than the three phases shown. Increased torque per unit motor weight can be acquired by increasing the number of phases in each motor. The ratio of laminated sections to low permeance sections in the stator and rotor discs also can be varied.

The FIG. 5 circuit uses the same commutating capacitors 124 and 136 and inductors 126 and 138 to commutate the SCRs in 3 motor phases, which are separated in the FIG. by dashed lines 150 and 152. All connections in FIG. 5 are identical to FIG. 3 except for those described below.

Capacitor 124 has its undotted plate connected directly to terminal 78 and its dotted plate connected to the anode of SCR 122. The cathode of SCR 122 is connected to terminal 74. Inductor 126 connects the anode of SCR 128 to terminal 78 and the cathode of SCR 128 is connected to the anode of SCR 122.

On the secondary side of winding 20, the anode of SCR 134 is connected to terminal 75 and the cathode is connected to the undotted plate of capacitor 136 and the anode of SCR 140. The dotted plate of capacitor 136 is connected to terminal 79 and inductor 138 connects the cathode of SCR 140 to terminal 79.

Winding 26 of the second phase is coupled to terminals 78 and 79 by SCRs 120' and 132' and diodes 130' and 142' similar to winding 20 of the first phase. Corresponding SCRs 120'' and 132'' with diodes 130'' and 142'' couple winding 30 of the third phase to terminals 78 and 79. Note, however, that neither the second nor the third phase contains a commutating circuit; instead, SCRs 122' and 122'' couple the dotted plate of capacitor 124 to the respective anodes of SCRs 120' and 120'', and SCRs 134' and 134'' couple the undotted plate of capacitor 136 to the respective cathodes of SCRs 132' and 132''.

Commutation in the first phase of FIG. 5 takes place in the following manner. Initially, a charge is formed on the undotted plate of capacitor 124 by triggering SCR 122 and SCR 132. Inductor 126 pumps the positive charge to the dotted terminal of capacitor 124 by triggering SCR 128. A positive charge then is formed on the undotted plate of capacitor 136 by triggering SCR 120 and SCR 134. Inductor 138 pumps the positive charge to the dotted plate of capacitor 136 by triggering SCR 140. The first phase then is operated as described for FIG. 3.

The first phase can be operated so capacitors 124 and 136 are charged or uncharged at the conclusion of its operation. If the capacitors are charged, the charge is switched if necessary to the dotted plates as described above. If the capacitors are uncharged, a positive charge is formed on the undotted plate of capacitor 124 as the laminated sections of the second phase begin overlapping by triggering SCR 122' and SCR 132'. The charging current passes through winding 26. Charge reversal across the capacitor is achieved by triggering SCR 128. A positive charge then is formed on the undotted plate of capacitor 136 by triggering SCRs 120' and 134', and the charge is reversed by triggering SCR 140.

SCRs 120' and 132' are triggered to begin building current in winding 26. When winding current reaches the predetermined point, triggering SCR 122' commutates SCR 120'. Freewheeling and current reinforcing are carried out as described with reference to FIG. 3. As the second phase approaches the end of its operation, triggering SCR 134' commutates SCR 132' and the current in winding 26 returns to battery 90 via diodes 130' and 142'.

Third phase operation is produced in the same manner. Common commutating capacitors can be used for additional phases unless a conflict develops in the charging and discharging of the capacitors. Two or more phases in alignment with each other also can use common commutating capacitors coupled as described.

Thus this invention provides a power circuit for variable reluctance-type electric motors that supplies electric power to the motor with a high degree of efficiency, returns unused portions of the power to the power supply, and achieves several different types of operation without additional components. The power circuit can use readily available electrical components and is useful with various sources of electrical energy. Current waveforms approaching the ideal wave are produced by the disclosed process of building current in the winding and then freewheeling and reinforcing the current.

I claim:

1. In a reluctance motor having a motor winding that has a varying inductance during motor operation, a power circuit for applying electrical power from a DC source of electrical energy having a positive terminal and a negative terminal to said motor winding comprising:

a primary switching device connecting the positive terminal of said source of electrical energy to the primary terminal of said motor winding and a secondary switching device connecting the secondary terminal of the motor winding to the negative terminal of said source of electrical energy;

a primary commutating means connected in parallel with said primary switching device and a secondary commutating means connected in parallel with said secondary switching device, each of said commutating means including a commutating capacitor in series with a commutating switching device; and a primary rectifying device having its anode connected to the negative terminal of said source of electrical energy and its cathode connected to the primary terminal of the motor winding, and a secondary rectifying device having its anode connected to the secondary terminal of the motor winding and its cathode connected to the positive terminal of said source of electrical energy.

2. The reluctance motor of claim 1 in which each commutating means includes means for reversing the charge on its commutating capacitor.

3. The reluctance motor of claim 2 in which each charge-reversing means includes an inductor in series with a switching device, each inductor and switching device being connected in parallel with its commutating capacitor.

4. The reluctance motor of claim 3 in which the switching devices are thyristors and the rectifying devices are diodes.

5. The reluctance motor of claim 4 comprising a plurality of motor windings, primary and secondary switching devices for each motor winding, primary and secondary rectifying devices for each winding, and a single primary commutating means and a single secondary commutating means, said primary commutating means commutating each of the primary switching devices and said secondary commutating means commutating each of the secondary switching devices.

6. The reluctance motor of claim 5 in which the primary commutating capacitor and the primary commutating switching device are connected in parallel with the primary switching device of one phase.

7. The reluctance motor of claim 6 in which a primary commutating switching device for the primary switching device of the second winding is connected in series with the primary commutating capacitor of the first winding.

8. The reluctance motor of claim 1 comprising a plurality of motor windings, primary and secondary switching devices for each motor winding, primary and secondary rectifying devices for each winding, and a single primary commutating means and a single secondary commutating means, said primary commutating means commutating each of the primary switching devices and said secondary commutating means commutating each of the secondary switching devices.

9. The reluctance motor of claim 1 in which the switching devices are thyristors and the rectifying devices are diodes.

10. A process for producing current in the winding of a variable reluctance motor comprising:
    coupling a source of electrical energy across the winding until current in the winding reaches a predetermined value;
    freewheeling the current in the winding under the induced voltage generated by the self-inductance in the winding until the current reaches a predetermined value;
    reinforcing the current by coupling again the source of electrical energy across the winding;
    decoupling again the source of electrical energy from the winding when current in the winding reaches a predetermined value; and
    returning current from the winding under the induced voltage generated by the self-inductance in the winding to the source of electrical energy.

11. The process of claim 10 comprising freewheeling the current in the winding under the induced voltage generated by the self-inductance in the winding after the current has been reinforced.

12. The process of claim 11 comprising commutating a solid-state switching device to perform said decoupling steps by storing an electrical charge from said source of electrical energy on a capacitor coupled in parallel with said switching device, reversing said stored charge across said capacitor, coupling said charge across said switching device at the predetermined time, and discharging said capacitor through said motor winding to increase the current in the motor winding.